(12) United States Patent
Matsutani et al.

(10) Patent No.: US 12,508,875 B2
(45) Date of Patent: Dec. 30, 2025

(54) THERMAL MANAGEMENT SYSTEM AND CONTROL METHOD OF THERMAL MANAGEMENT SYSTEM

(71) Applicant: TOYOTA JIDOSHA KABUSHIKI KAISHA, Toyota (JP)

(72) Inventors: Takashi Matsutani, Toyota (JP); Hideto Minekawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 18/530,310

(22) Filed: Dec. 6, 2023

(65) Prior Publication Data
US 2024/0262165 A1   Aug. 8, 2024

(30) Foreign Application Priority Data
Feb. 3, 2023   (JP) .................................. 2023-015485

(51) Int. Cl.
*B60H 1/00* (2006.01)

(52) U.S. Cl.
CPC ............................... *B60H 1/00907* (2013.01)

(58) Field of Classification Search
CPC ............ B60H 1/00907; B60H 1/143; B60H 1/00278; B60H 1/00499; B60H 1/3228; B60H 1/32281; B60H 1/32284; B60H 2001/00928; B60H 2001/00949
See application file for complete search history.

(56) References Cited

U.S. PATENT DOCUMENTS

| | | | |
|---|---|---|---|
| 9,533,544 B2* | 1/2017 | Johnston | B60H 1/00278 |
| 2012/0183815 A1* | 7/2012 | Johnston | B60L 58/26 |
| | | | 429/50 |
| 2021/0300154 A1 | 9/2021 | Hasegawa et al. | |

FOREIGN PATENT DOCUMENTS

| | | |
|---|---|---|
| JP | 2021-156234 A | 10/2021 |
| KR | 10-2021-0103019 A | 8/2021 |
| WO | 2022/005217 A1 | 1/2022 |

* cited by examiner

*Primary Examiner* — Miguel A Diaz
(74) *Attorney, Agent, or Firm* — Oliff PLC

(57) ABSTRACT

A thermal management system includes a thermal management circuit that includes a first refrigerant circuit through which a first refrigerant flows and that includes a battery and a first radiator, and a second refrigerant circuit through which a second refrigerant different from the first refrigerant flows and that includes a heater, a first switching valve configured to switch whether the first refrigerant flows through the battery, a heat exchanger that is connected to a portion of the first refrigerant circuit between the battery and the first switching valve, and a predetermined portion of the second refrigerant circuit, and a control device. The control device is configured to control the first switching valve such that the first refrigerant flows through the battery, and to control the heater, so as to control heat exchange between the first refrigerant and the second refrigerant in the heat exchanger.

11 Claims, 10 Drawing Sheets

THERMAL MANAGEMENT SYSTEM AND CONTROL METHOD OF THERMAL MANAGEMENT SYSTEM

CROSS-REFERENCE TO RELATED APPLICATION

This application claims priority to Japanese Patent Application No. 2023-015485 filed on Feb. 3, 2023, incorporated herein by reference in its entirety.

BACKGROUND

1. Technical Field

The present disclosure relates to a thermal management system and a control method of a thermal management system.

2. Description of Related Art

Japanese Unexamined Patent Application Publication No. 2021-156234 (JP 2021-156234 A) discloses a thermal management device in which a thermal circuit is provided with a battery, a first radiator and a second radiator. In this heat circuit, heat exchange is performed between a first heat medium flowing through the first radiator and a second heat medium flowing through the second radiator. Further, the heat circuit is provided with a three-way valve that controls the flow of the first heat medium to the battery.

SUMMARY

Now, in a heat circuit such as that described in JP 2021-156234 A, temperature of the battery can be adjusted using heat obtained by the first heat medium through heat exchange between the first radiator and the second radiator. However, it is conceivable that most of the heat obtained by the first heat medium will be lost (escape) along the way, when a location where heat exchange is performed is far from the battery or the like, for example. In this case, it becomes difficult to transfer the heat that the first heat medium has obtained through heat exchange, to the battery. Accordingly, there is demand for efficient transferring of heat obtained by heat exchange to the battery by the heat medium (refrigerant).

The present disclosure provides a thermal management system and a control method of a thermal management system, in which the refrigerant can efficiently transfer, to the battery, heat that is obtained by heat exchange performed prior to flowing to the battery.

A thermal management system according to a first aspect of the present disclosure includes a thermal management circuit that includes a first refrigerant circuit through which a first refrigerant flows and that includes a battery and a first radiator, and a second refrigerant circuit through which a second refrigerant different from the first refrigerant flows and that includes a heater, a first switching valve configured to switch whether the first refrigerant flows through the battery, a heat exchanger that is connected to a portion of the first refrigerant circuit between the battery and the first switching valve, and a predetermined portion of the second refrigerant circuit, and that is configured to perform heat exchange between the first refrigerant and the second refrigerant, and a control device that is configured to control each of the first switching valve and the heater. The control device is configured to control the first switching valve such that the first refrigerant flows through the battery, and to control the heater, so as to control the heat exchange between the first refrigerant and the second refrigerant in the heat exchanger.

In the thermal management system according to the first aspect of the present disclosure, as described above, the portion of the first refrigerant circuit between the battery and the first switching valve is connected to the heat exchanger. Accordingly, the distance between the heat exchanger and the battery can be reduced as compared to a case in which the heat exchanger is connected to a portion on a side opposite to the battery with respect to the first switching valve, in a flow direction of the first refrigerant. As a result, the amount of heat that is lost (escaped) from the first refrigerant before the first refrigerant reaches the battery can be reduced. Thus, the first refrigerant can efficiently transfer, to the battery, the heat obtained by heat exchange prior to flowing through the battery.

In the thermal management system according to the first aspect of the present disclosure, the second refrigerant circuit may further include a second radiator that is different from the first radiator. The heat exchanger may be provided independently of the first radiator and the second radiator. According to this configuration, the temperature of the battery can be adjusted using the heat exchanger in addition to the first radiator and the second radiator, and accordingly the temperature of the battery can be easily adjusted.

The thermal management system according to the first aspect of the present disclosure may further include a second switching valve configured to switch whether the second refrigerant flows through the heat exchanger. The control device may be configured to control the second switching valve so as to cause the second refrigerant to flow through the heat exchanger, when the heat exchange between the first refrigerant and the second refrigerant in the heat exchanger is performed. According to this configuration, heat exchange in the heat exchanger can be easily controlled by controlling the second switching valve.

The thermal management system according to the first aspect of the present disclosure may further include a temperature sensing unit configured to sense a temperature of the battery. The control device may be configured to, based on the temperature of the battery sensed by the temperature sensing unit, control the heat exchange between the first refrigerant and the second refrigerant in the heat exchanger. According to this configuration, the temperature of the battery can be precisely controlled according to sensing results of the temperature sensing unit.

In the thermal management system according to the first aspect of the present disclosure, the control device may be configured to, when the temperature of the battery sensed by the temperature sensing unit is lower than a first threshold value, perform heating control in which the battery is heated by driving the heater to heat the second refrigerant such that the first refrigerant that is heat-exchanged with the second refrigerant is heated. According to this configuration, heating control can be easily started based on the first threshold value.

In the thermal management system according to the first aspect of the present disclosure, the control device may be configured to perform the heating control, when the temperature of the battery sensed by the temperature sensing unit is lower than a second threshold value and external charging of the battery is executed. According to this configuration, the battery can be easily heated based on the temperature of the battery when external charging of the battery is performed. Also, the temperature of the battery can be raised during external charging, the efficiency of external charging can be improved and charging time can be shortened.

In the thermal management system according to the first aspect of the present disclosure, the battery may be installed in an electrified vehicle. The control device may be configured to, when the temperature of the battery sensed by the temperature sensing unit is lower than a third threshold value, retain the temperature of the battery at a predetermined temperature range, by performing the heating control following charging of the battery, until a travelling start time of the electrified vehicle. According to this configuration, the electrified vehicle can start traveling in a state in which the battery has been warmed up.

In the thermal management system according to the first aspect of the present disclosure, the control device may be configured to, when the temperature of the battery sensed by the temperature sensing unit is higher than a fourth threshold value, perform cooling control in which the battery is cooled by stopping driving of the heater to cool the second refrigerant such that the first refrigerant that is heat-exchanged with the second refrigerant is cooled. According to this configuration, cooling control can be easily started based on the fourth threshold value.

A control method of a heat management system according to a second aspect of the present disclosure may be a control method of a thermal management system including a thermal management circuit that includes a first refrigerant circuit through which a first refrigerant flows and that includes a battery and a first radiator, and a second refrigerant circuit through which a second refrigerant different from the first refrigerant flows and that includes a heater. The control method may include adjusting a temperature of the second refrigerant by controlling the heater, and controlling a first switching valve to cause the first refrigerant to flow through the battery such that heat exchange between the first refrigerant and the second refrigerant is performed in a heat exchanger, the first switching valve being configured to switch whether the first refrigerant flows through the battery, the heat exchanger being connected to a portion of the first refrigerant circuit between the battery and the first switching valve, and a predetermined portion of the second refrigerant circuit, and the heat exchanger being configured to perform the heat exchange between the first refrigerant and the second refrigerant. The thermal management system may further include the first switching valve and the heat exchanger.

In the control method of the thermal management system according to the second aspect of the present disclosure, as described above, the heat exchanger connected to the portion of the first refrigerant circuit between the battery and the first switching valve may be used to perform the heat exchange between the first refrigerant and the second refrigerant. Accordingly, a control method of the thermal management system can be provided in which the first refrigerant can efficiently transfer, to the battery, heat obtained by heat exchange performed prior to flowing to the battery.

According to the present disclosure, the refrigerant can efficiently transfer, to the battery, the heat obtained by heat exchange prior to flowing through the battery.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
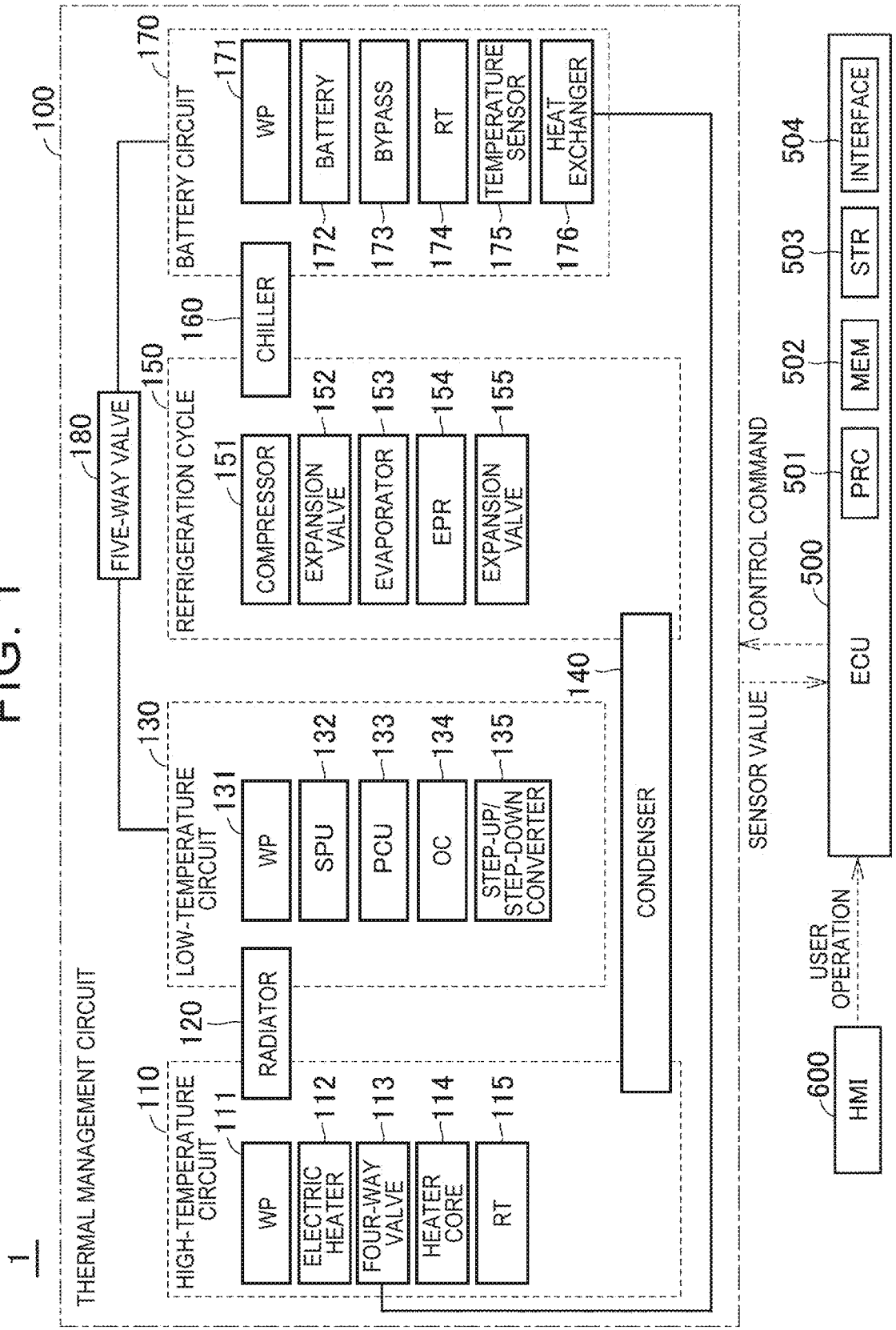
FIG. 1 is a diagram illustrating a configuration of a thermal management system according to an embodiment.

An embodiment of the present disclosure will be described in detail below with reference to the drawings. The same or corresponding parts in the drawings are denoted by the same signs, and repetitive description will be omitted.

Figure 10:
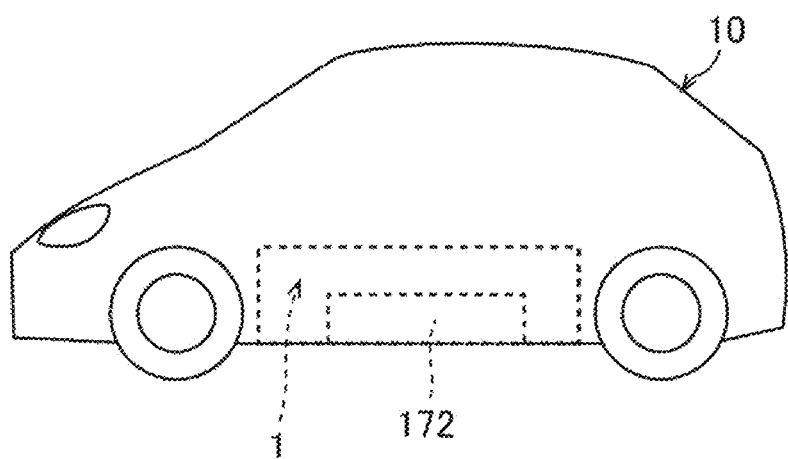
FIG. 10 is a diagram illustrating a configuration of an electrified vehicle in which the thermal management system according to the embodiment is installed.

Hereinafter, a configuration in which a thermal management system 1 according to the present disclosure is installed in an electrified vehicle 10 (see FIG. 10) will be described as an example. The electrified vehicle 10 is a vehicle in which a traction battery is installed, and is, for example, a battery electric vehicle (BEV). The electrified vehicle 10 may be a hybrid electric vehicle (HEV), a plug-in hybrid electric vehicle (PHEV), or a fuel cell electric vehicle (FCEV). However, the thermal management system according to the present disclosure is not limited to vehicle applications.

Overall Configuration

FIG. 1 is a diagram illustrating an example of an overall configuration of the thermal management system 1 according to the embodiment of the present disclosure. The thermal management system 1 includes a thermal management circuit 100, an electronic control unit (ECU) 500, and a human machine interface (HMI) 600. Note that the ECU 500 is an example of a "control device" in the present disclosure.

The thermal management circuit 100 is configured to allow a heat medium to flow therethrough. The thermal management circuit 100 includes a high-temperature circuit 110, a radiator 120, a low-temperature circuit 130, a condenser 140, a refrigeration cycle 150, a chiller 160, a battery circuit 170, and a five-way valve 180, for example. Note that a refrigerant circuit including the low-temperature circuit 130 and the battery circuit 170 is an example of a "first refrigerant circuit" according to the present disclosure. Also, the high-temperature circuit 110 is an example of a "second refrigerant circuit" according to the present disclosure. Also, the five-way valve 180 is an example of a "first switching unit" according to the present disclosure.

The high-temperature circuit 110 includes, for example, a water pump (WP) 111, an electric heater 112, a four-way valve 113, a heater core 114, a reservoir tank (RT) 115, and a high-temperature (HT) radiator 121 that will be described later. Note that the electric heater 112 and the high-temperature radiator 121 are examples of a "heater" and a "second radiator" according to the present disclosure, respectively.

The radiator 120 is connected to (i.e., shared by) both the high-temperature circuit 110 and the low-temperature circuit 130. The radiator 120 includes the high-temperature radiator 121 and a low-temperature (LT) radiator 122 (see FIG. 2 for either). Note that the low-temperature radiator 122 is an example of a "first radiator" according to the present disclosure.

The low-temperature circuit 130 includes, for example, a water pump 131, a smart power unit (SPU) 132, a power control unit (PCU) 133, an oil cooler (OC) 134, a step-up/step-down converter 135, and the low-temperature radiator 122.

The condenser 140 is connected to both the high-temperature circuit 110 and the refrigeration cycle 150.

The refrigeration cycle 150 includes, for example, a compressor 151, an expansion valve 152, an evaporator 153, an evaporative pressure regulator (EPR) 154, and an expansion valve 155.

The chiller 160 is connected to both the refrigeration cycle 150 and the battery circuit 170.

The battery circuit 170 includes a water pump 171, a battery 172, a bypass path 173, a reservoir tank 174, a temperature sensor 175, and a heat exchanger 176, for example. Note that the heat exchanger 176 is also connected to the high-temperature circuit 110. Also note that the temperature sensor 175 is an example of a "temperature sensing unit" according to the present disclosure.

The five-way valve 180 is connected to the low-temperature circuit 130 and the battery circuit 170. The configuration of the thermal management circuit 100 will be described in detail with reference to FIG. 2.

The ECU 500 controls the thermal management circuit 100. The ECU 500 includes a processor 501, memory 502, storage 503, and an interface 504.

The processor 501 is, for example, a central processing unit (CPU) or a micro-processing unit (MPU). The memory 502 is, for example, random-access memory (RAM). The storage 503 is rewritable non-volatile memory such as a hard disk drive (HDD), a solid state drive (SSD), flash memory, or the like. The storage 503 stores system programs including an operating system (OS), and control programs including computer-readable code necessary for control computation. The processor 501 realizes various types of processing by reading the system programs and the control programs, performing loading thereof to the memory 502, and performing execution thereof. The interface 504 controls communication between the ECU 500 and components of the thermal management circuit 100.

The ECU 500 generates control commands based on sensor values acquired from various types of sensor (e.g., temperature sensor 175) included in the thermal management circuit 100, user operations received by the HMI 600, and so forth, and outputs the generated control commands to the thermal management circuit 100. For example, the ECU 500 switches the path of flow of the heat medium by controlling the states of the five-way valve 180 and the four-way valve 113. The ECU 500 also controls turning on/off of the electric heater 112 and the output (temperature) of the electric heater 112. The ECU 500 may be divided into a plurality of ECUs by function. Although an example in which the ECU 500 includes one processor 501 is illustrated in FIG. 1, the ECU 500 may include a plurality of processors. The same applies to the memory 502 and the storage 503.

In the present specification, the term "processor" is not limited to a processor in a narrow sense that executes a process by a stored program method, and may include hardwired circuitry such as an application specific integrated circuit (ASIC), a field-programmable gate array (FPGA), or the like. Accordingly, the term "processor" may be reread as "processing circuitry" that executes processing defined in advance by computer-readable code and/or hardwired circuitry.

The HMI 600 is a display with a touch panel, an operation panel, a console, or the like. The HMI 600 receives user operations for controlling the thermal management system 1. The HMI 600 outputs signals that indicate user operations to the ECU 500.

Configuration of Thermal Management Circuit

Figure 2:
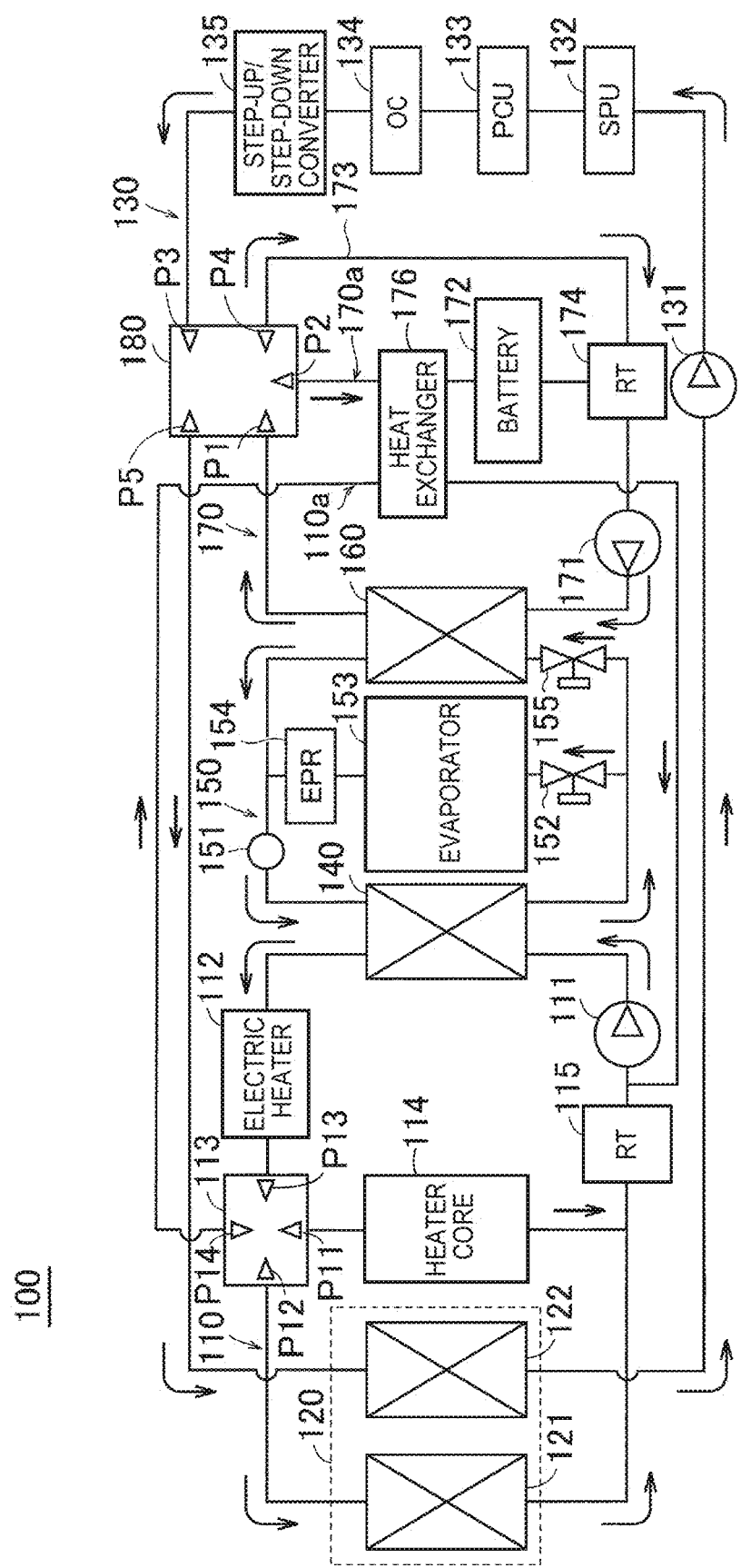
FIG. 2 is a diagram illustrating a detailed configuration of the thermal management system according to the embodiment.

FIG. 2 is a diagram illustrating an example of the configuration of the thermal management circuit 100 according to the present embodiment. A heat medium (usually hot water) circulating in the high-temperature circuit 110 flows through at least one of a first path made up of the water pump 111—the condenser 140—the electric heater 112—the four-way valve 113—the heater core 114—the reservoir tank 115—the water pump 111, a second path made up of the water pump 111—the condenser 140—the electric heater 112—the four-way valve 113—the high-temperature radiator 121—the reservoir tank 115—the water pump 111, and a third path made up of the water pump 111—the condenser 140—the electric heater 112—the four-way valve 113—the heat exchanger 176—the water pump 111. Note that the heat medium circulating in the high-temperature circuit 110 is an example of the "second refrigerant" in the present disclosure.

The four-way valve 113 is configured to switch whether the heat medium flowing through the high-temperature circuit 110 flows through the heat exchanger 176. Also, the four-way valve 113 is provided with four ports, P11 to P14. The port P11 is an outlet port from which the heat medium flows toward the heater core. The port P12 is an outlet port from which the heat medium flows toward the high-temperature radiator 121. The port P13 is an inlet port into which the heat medium flows from the electric heater 112. The port P14 is an outlet port from which the heat medium flows toward the heat exchanger 176.

A heat medium (coolant) that circulates in the low-temperature circuit 130 flows through a path made up of the water pump 131—the SPU 132—the PCU 133—the oil cooler 134—the step-up/step-down converter 135—the five-way valve 180—the low-temperature radiator 122—the water pump 131. Note that the heat medium flowing through the low-temperature circuit 130 is an example of the "first refrigerant" in the present disclosure.

The water pump 131 causes the heat medium in the low-temperature circuit 130 to circulate in accordance with control commands from the ECU 500. The SPU 132 controls charging/discharging of the battery 172 in accordance with control commands from the ECU 500. The PCU 133 converts direct current electric power supplied from the battery 172 to alternating current electric power, and supplies this alternating current electric power to a motor (omitted from illustration) that is built into a transaxle, in accordance with control commands from the ECU 500. The oil cooler 134 circulates lubricating oil for the motor by using an electrical oil pump (EOP) (omitted from illustration). The SPU 132, the PCU 133, the oil cooler 134, and the step-up/step-down converter 135 are cooled by the heat medium circulating in the low-temperature circuit 130. The five-way valve 180 switches the paths of the heat medium in the low-temperature circuit 130 and the battery circuit 170 in accordance with control commands from the ECU 500. The low-temperature radiator 122 is disposed in the vicinity of the high-temperature radiator 121, and performs heat exchange with the high-temperature radiator 121.

A heat medium (gaseous phase refrigerant or liquid phase refrigerant) that circulates in the refrigeration cycle 150 flows through one or both of a first path made up of the compressor 151—the condenser 140—the expansion valve 152—the evaporator 153—the EPR 154—the compressor 151, and a second path made up of the compressor 151—the condenser 140—the expansion valve 155—the chiller 160—the compressor 151.

A heat medium (coolant) that circulates in the battery circuit 170 flows through one or both of a first path made up of the water pump 171—the chiller 160—the five-way valve 180—the heat exchanger 176—the battery 172—the reservoir tank 174—the water pump 171, and a second path made up of the water pump 171—the chiller 160—the five-way valve 180—the bypass path 173—the reservoir tank 174—the water pump 171. Note that the heat medium circulating in the battery circuit 170 is an example of the "first refrigerant" in the present disclosure.

The water pump 171 circulates the heat medium in the battery circuit 170 in accordance with control commands from the ECU 500. The chiller 160 cools the heat medium circulating in the battery circuit 170 through heat exchange between the heat medium circulating in the refrigeration cycle 150 and the heat medium circulating in the battery circuit 170. The battery 172 supplies electric power for traction to the motor built into the transaxle. The battery 172 may be heated by the heat exchanger 176 or may be cooled by the chiller 160. The bypass path 173 is provided to cause the heat medium to bypass the heat exchanger 176 and the battery 172. When the heat medium flows through the bypass path 173, change in temperature of the heat medium associated with heat absorption and heat dissipation between the heat medium and the battery 172 can be suppressed. The reservoir tank 174 maintains the pressure and the amount of the heat medium in the battery circuit 170 by storing a part of the heat medium in the battery circuit 170. The temperature sensor 175 (see FIG. 1) senses the temperature of the battery 172. Results of sensing by the temperature sensor 175 are transmitted to the ECU 500. The heat exchanger 176 is connected to a portion 170a between the battery 172 and the five-way valve 180, and also to a portion 110a of the high-temperature circuit 110.

The five-way valve 180 is configured to switch whether the heat medium flowing through the low-temperature circuit 130 flows through the battery 172. Also, the five-way valve 180 is provided with five ports P1 to P5. The port P1 is an inlet port into which the heat medium flows from the chiller 160. The port P2 is an outlet port through which the heat medium flows out toward the heat exchanger 176 and the battery 172 of the battery circuit 170. The port P3 is an inlet port into which the heat medium flows from the SPU 132, the PCU 133, the oil cooler 134, and the step-up/step-down converter 135 of the low-temperature circuit 130. The port P4 is an outlet port from which the heat medium flows toward the bypass path 173 of the battery circuit 170. The port P5 is an outlet port from which the heat medium flows toward the low-temperature radiator 122.

Communication Patterns

Figure 3:
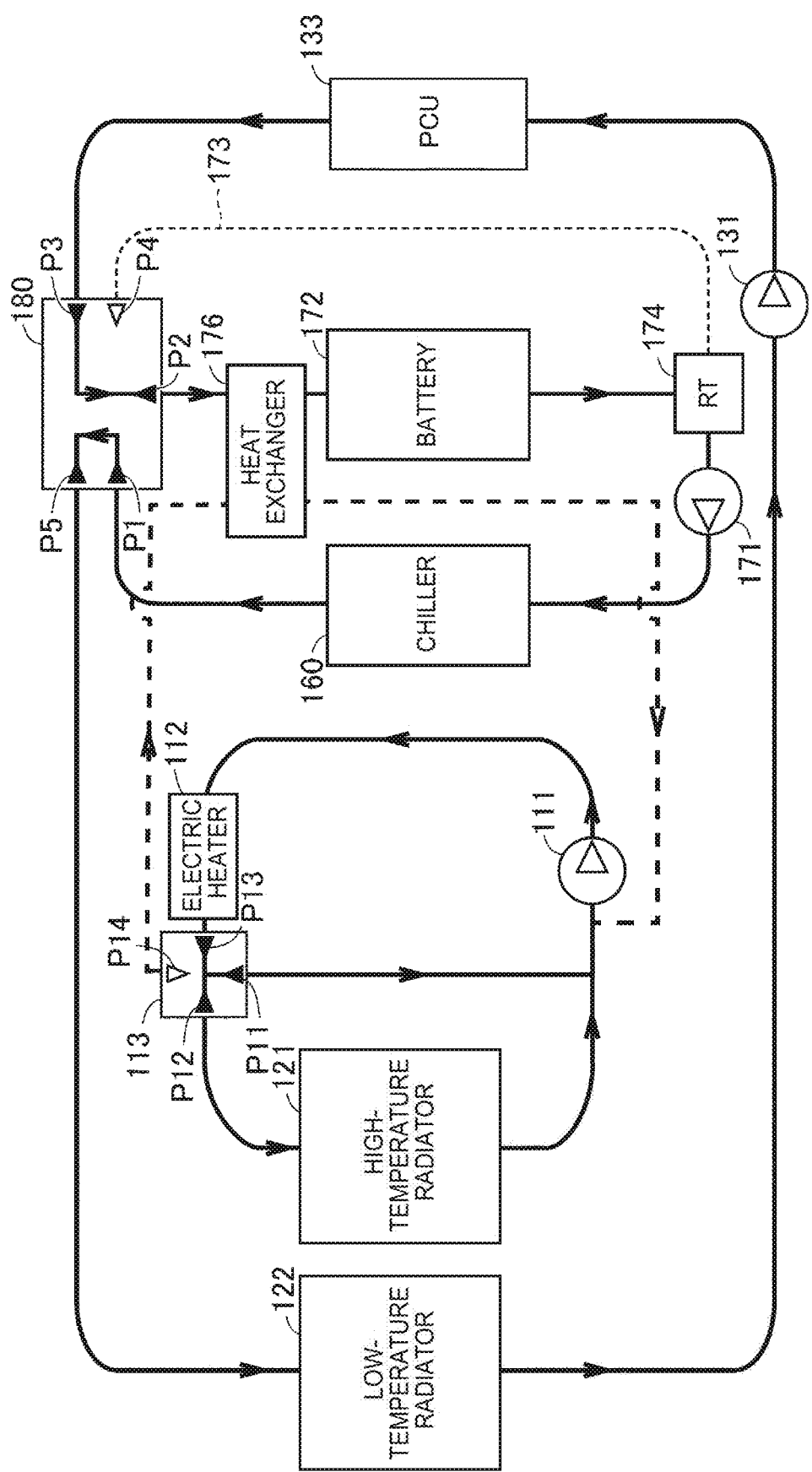
FIG. 3 is a diagram illustrating an example of a state of the thermal management circuit according to the embodiment.
Figure 4:
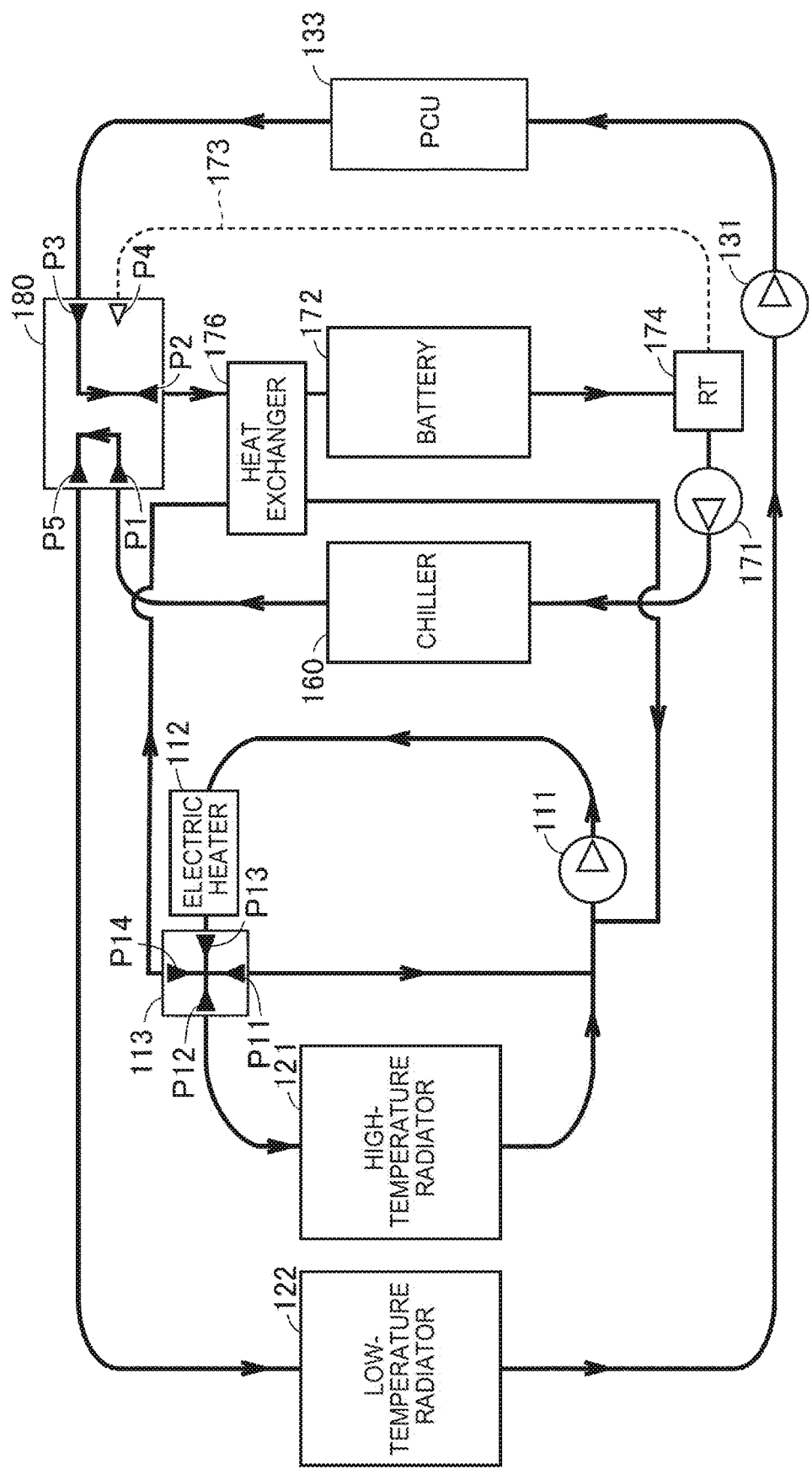
FIG. 4 is a diagram illustrating an example of a state of the thermal management circuit when regulating battery temperature, according to the embodiment.

FIGS. 3 and 4 are each a conceptual diagram illustrating an overview of a first communication pattern and a second communication pattern of the five-way valve 180.

In the first communication pattern, as illustrated in FIG. 3, the five-way valve 180 forms a path that communicates between the port P1 and the port P5, and a path that communicates between the port P3 and the port P2. In this case, the low-temperature circuit 130 and the battery circuit 170 are connected in series with each other.

Also, in the first communication pattern (see FIG. 3), the port P14 of the four-way valve 113 is placed in a closed state by the ECU 500. Accordingly, the heat medium flowing through the high-temperature circuit 110 does not flow through the heat exchanger 176.

The second communication pattern (see FIG. 4) differs from the first communication pattern (see FIG. 3) in that the port P14 of the four-way valve 113 is placed in an opened state by the ECU 500. As a result, in the second communication pattern, the heat medium flowing from the electric heater 112 to the port P13 flows out from the port P14 and also flows through the heat exchanger 176. As described earlier, the heat exchanger 176 is connected to the portion 110a of high-temperature circuit 110 (see FIG. 2). Accordingly, in the second communication pattern, the heat medium flowing through the battery circuit 170 (low-temperature circuit 130) and the heat medium flowing through the high-temperature circuit 110 each flow into the heat exchanger 176. As a result, in the heat exchanger 176, heat exchange is performed between the heat medium flowing through the battery circuit 170 (low-temperature circuit 130) and the heat medium flowing through the high-temperature circuit 110.

Here, in the thermal management circuit, there are cases in which the temperature of the battery is adjusted using heat obtained by the heat medium of the low-temperature circuit through heat exchange between the high-temperature radiator and the low-temperature radiator. However, depending on the locations of the radiators, there are cases in which much of the heat obtained by the heat medium through heat exchange is lost (escapes) before reaching the battery. In this case, it becomes difficult to transfer the heat, obtained by the heat medium through heat exchange, to the battery. There is demand for efficient transferring of heat, obtained by heat exchange, to the battery by the heat medium.

Accordingly, in the present embodiment, the heat exchanger 176 is connected to the portion 170a of the battery circuit 170 between the five-way valve 180 and the battery 172. On the other hand, the low-temperature radiator 122 is provided on a side opposite to the battery 172 with respect to the five-way valve 180, in the flow direction of the heat medium of the low-temperature circuit 130. Accordingly, the heat exchanger 176 is provided at a closer location to the battery 172 than the low-temperature radiator 122 in the flow direction of the heat medium of the low-temperature circuit 130. Thus, the temperature of the heat medium can be suppressed from dropping while the heat medium is traveling from the heat exchanger 176 to the battery 172.

Control Method of Thermal Management System

A control method of the thermal management system 1 (ECU 500) will be described with reference to the flowcharts in FIGS. 5 to 9. Note that the threshold values for the temperature of the battery 172 in each of the flowcharts are exemplary, and values described below are not restrictive. Also, the flowcharts are merely exemplary, and the following examples are not restrictive.

Preheating Control Prior to Rapid Charging

Figure 5:
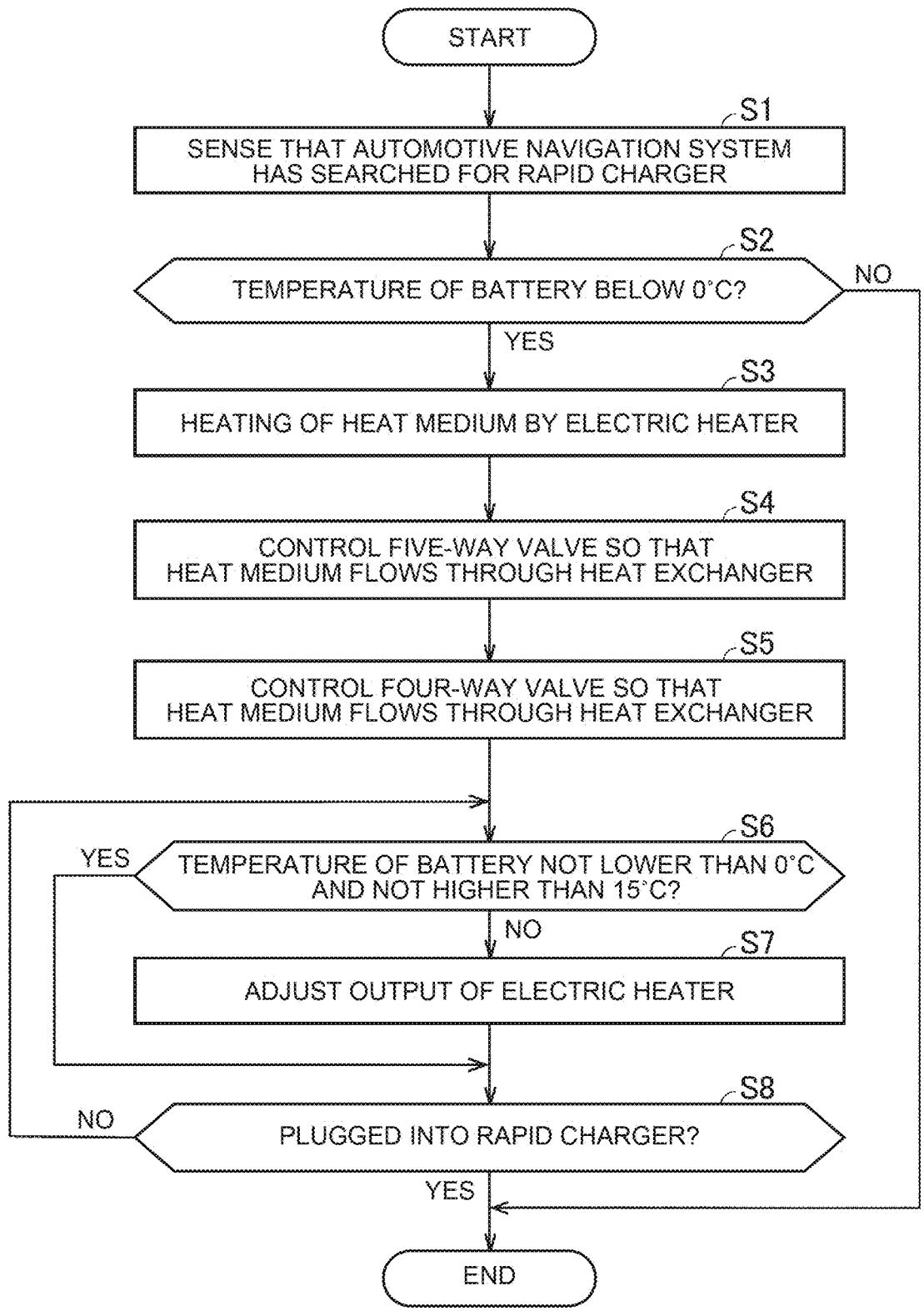
FIG. 5 is a flowchart showing preheating control performed by the thermal management system prior to rapid charging, according to the embodiment.

FIG. 5 is a flowchart of preheating control of the battery 172 prior to rapid charging (while traveling). Assumption will be made that in step S1, the ECU 500 senses that an automotive navigation system (omitted from illustration) of the electrified vehicle 10 has searched for a rapid charger or has searched for and found a rapid charger. Note that the automotive navigation system may display a message for confirming whether to perform heating control of the battery 172 by the electric heater. In this case, the control of step S2 and thereafter may be executed when a user selects to perform heating control. Also, at this time, a message may be displayed on the automotive navigation system relating to whether sufficient electric power remains to be able to reach the rapid charger when heating control is performed.

In step S2, the ECU 500 determines whether the temperature of the battery 172 sensed by the temperature sensor 175 is below 0° C., for example. Below 0° C. is an example of a temperature range indicating that the temperature of the battery 172 is a low-temperature unsuitable for charging the battery 172. When the temperature of the battery 172 is below 0° C. (Yes in S2), the processing advances to step S3. When the temperature of the battery 172 is 0° C. or higher (No in S2), the processing ends. Note that the above 0° C. is an example of a "first threshold value" in the present disclosure. The first threshold value may be a value other than 0° C.

In step S3, the ECU 500 controls the electric heater 112 to heat the heat medium flowing through the high-temperature circuit 110. Note that controlling the electric heater 112 includes processing for running the electric heater 112 and processing for increasing output (set temperature) of the electric heater 112.

In step S4, the ECU 500 controls the five-way valve 180 so that the heat medium flowing through the low-temperature circuit 130 flows through the heat exchanger 176 (battery 172). Also, in step S5, the ECU 500 controls the four-way valve 113 so that the heat medium from the electric heater 112 flows through the heat exchanger 176. Thus, the thermal management circuit 100 is in the state of the second flow pattern (see FIG. 4). Note that either of the processing of step S3 and the processing of steps S4 and S5 may be executed first, or the processing of step S3 and the processing of steps S4 and S5 may be executed concurrently with each other. Also, either of the processing of step S4 and the processing of step S5 may be executed first, or processing of step S4 and the processing of step S5 may be executed concurrently with each other.

In step S6, the ECU 500 determines whether the temperature of the battery 172 sensed by the temperature sensor 175 is not lower than 0° C. and not higher than 15° C., for example. When the temperature of the battery 172 is not lower than 0° C. and not higher than 15° C. (Yes in S6), the processing advances to step S8. When the temperature of the battery 172 is not in the range of not lower than 0° C. and not higher than 15° C. (No in S6), the processing advances to step S7. Note that as long as the temperature range is a temperature range that is higher than the temperature prior to starting heating by the electric heater 112, and is suitable for charging the battery 172, the determination criteria employed may be other than the range of not lower than 0° C. and not higher than 15° C.

In step S7, the ECU 500 adjusts the output of the electric heater 112. For example, when determination is made in step S6 that the temperature of the battery 172 is below 0° C., the ECU 500 may increase the output of the electric heater 112, or may maintain the current output. Also, when determination is made in step S6 that the temperature of the battery 172 is higher than 15° C., the ECU 500 may reduce the output of the electric heater 112 or stop the electric heater 112.

In step S8, the ECU 500 determines whether the electrified vehicle 10 is plugged into a rapid charger. When the electrified vehicle 10 is plugged into a rapid charger (Yes in S8), the processing ends. When the electrified vehicle 10 is not plugged into a rapid charger (No in S8), the processing returns to step S6.

Heating Control During Rapid Charging

Figure 6:
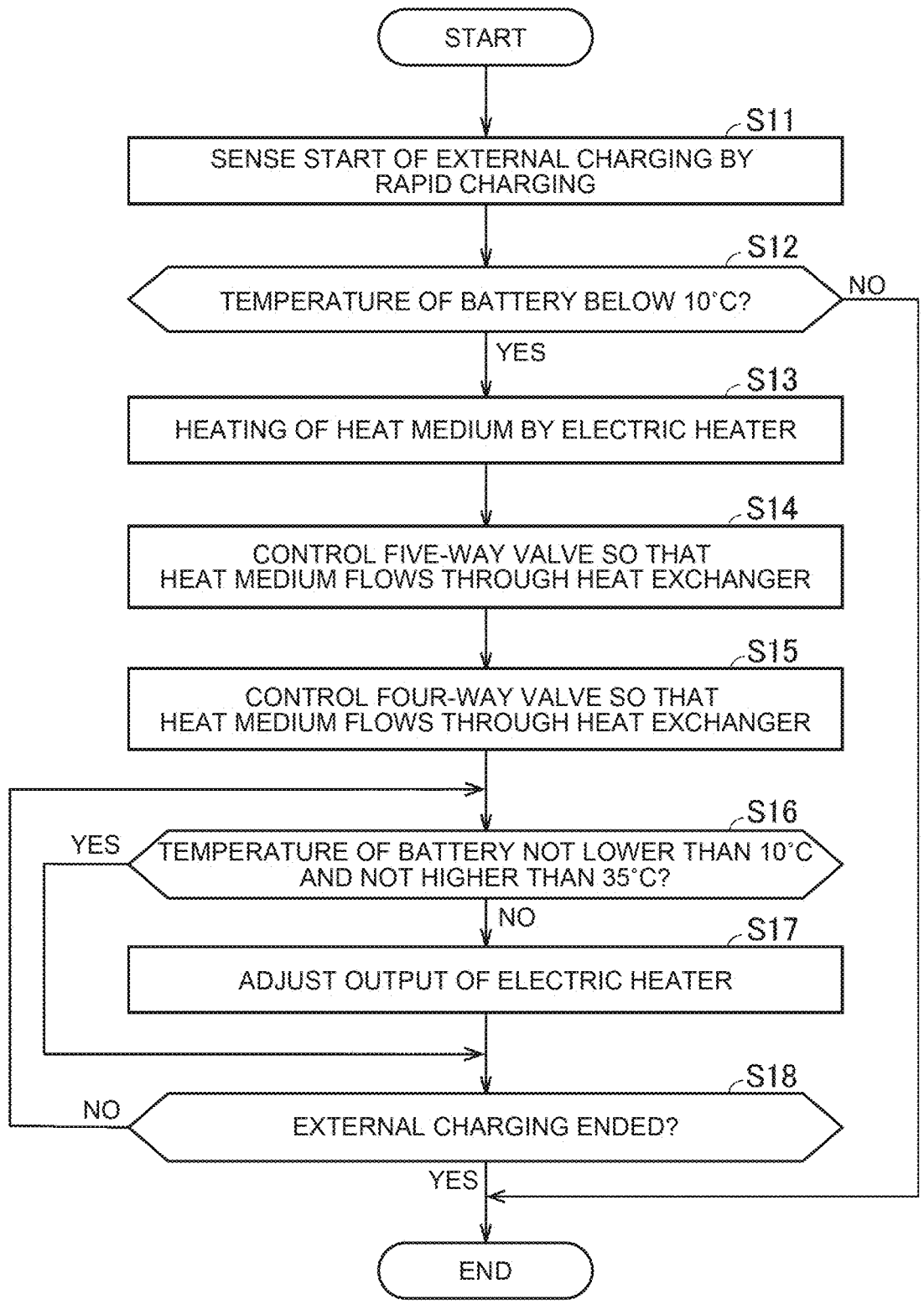
FIG. 6 is a flowchart showing heating control performed by the thermal management system during rapid charging, according to the embodiment.

FIG. 6 is a flowchart of heating control of the battery 172 during external charging by rapid charging. Assumption will be made that in step S11, the ECU 500 senses that external charging by rapid charging has started.

The processing in each of steps S12 to S17 below is the same as the processing in steps S2 to S7 in FIG. 5. Note that in step S12, the ECU 500 determines whether the temperature of the battery 172 is below 10° C., for example. Also, in step S16, the ECU 500 determines whether the temperature of the battery 172 is not lower than 10° C. and not higher than 35° C. Note that the threshold value of 10° C. in step S12 is an example of a "second threshold value" in the present disclosure. The second threshold value may be a value other than 10° C. Also, in step S16, the determination criteria employed may be other than the range of not lower than 10° C. and not higher than 35° C.

In step S18, the ECU 500 determines whether the external charging has ended. When the external charging has ended (Yes in S18), the processing ends. When the external charging has not ended (No in S18), the processing returns to step S16.

Heating Control During Normal Charging

Figure 7:
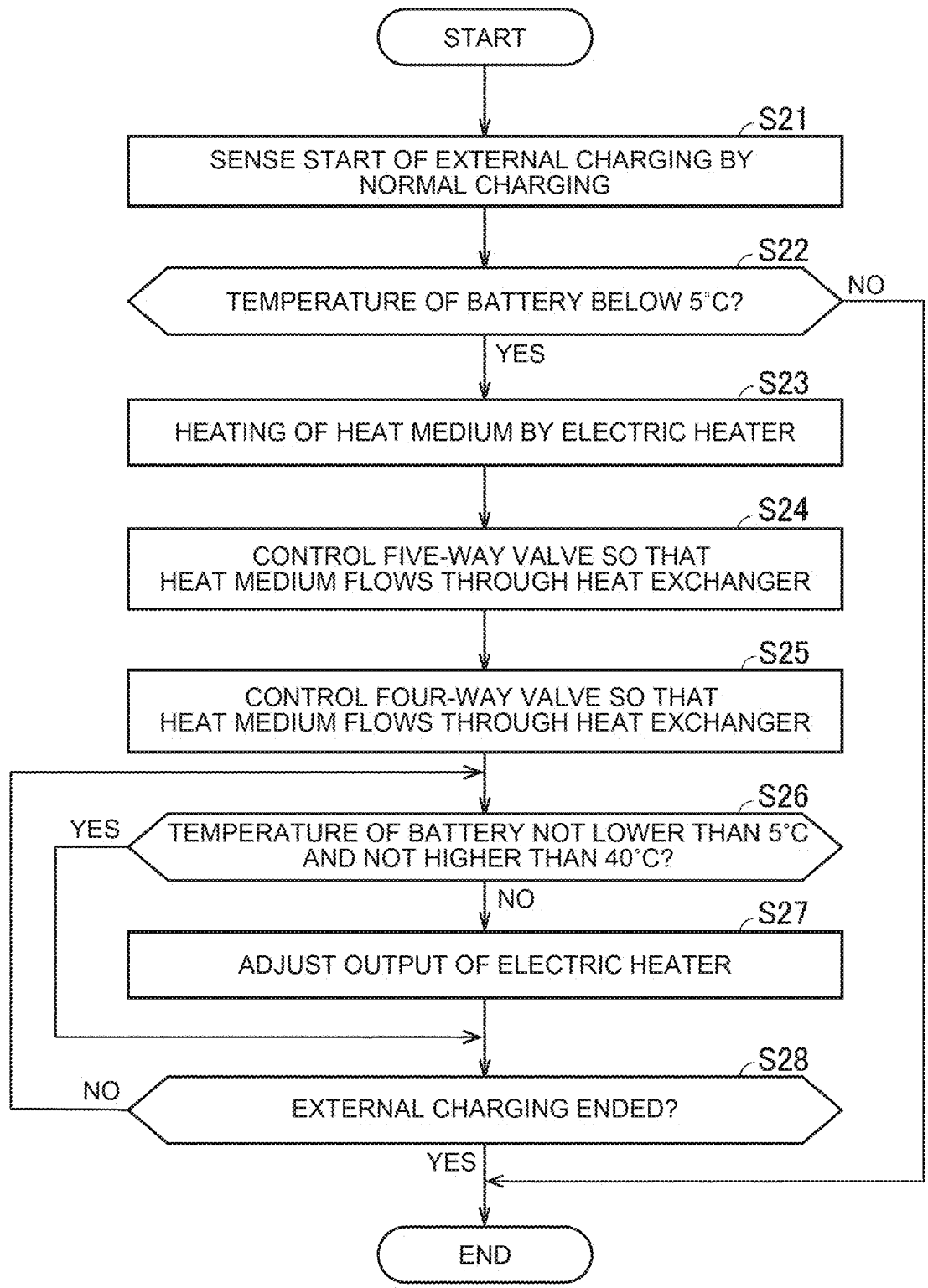
FIG. 7 is a flowchart showing heating control performed by the thermal management system during normal charging, according to the embodiment.

FIG. 7 is a flowchart of heating control of the battery 172 during external charging by normal charging. Assumption will be made that in step S21, the ECU 500 senses that external charging by normal charging has started. Note that normal charging means low-speed charging in which the charging speed is lower than that of rapid charging.

The processing in each of steps S22 to S28 below is the same as the processing in steps S12 to S18 in FIG. 6. Note that in step S22, the ECU 500 determines whether the temperature of the battery 172 is below 5° C. Also, in step S26, the ECU 500 determines whether the temperature of the battery 172 is not lower than 5° C. and not higher than 40° C. Note that the threshold value of 5° C. in step S22 is an example of a "second threshold value" in the present disclosure. The second threshold value may be a value other than 5° C. Also, in step S26, the determination criteria employed may be other than the range of not lower than 5° C. and not higher than 40° C.

Heating Control Following Normal Charging

Figure 8:
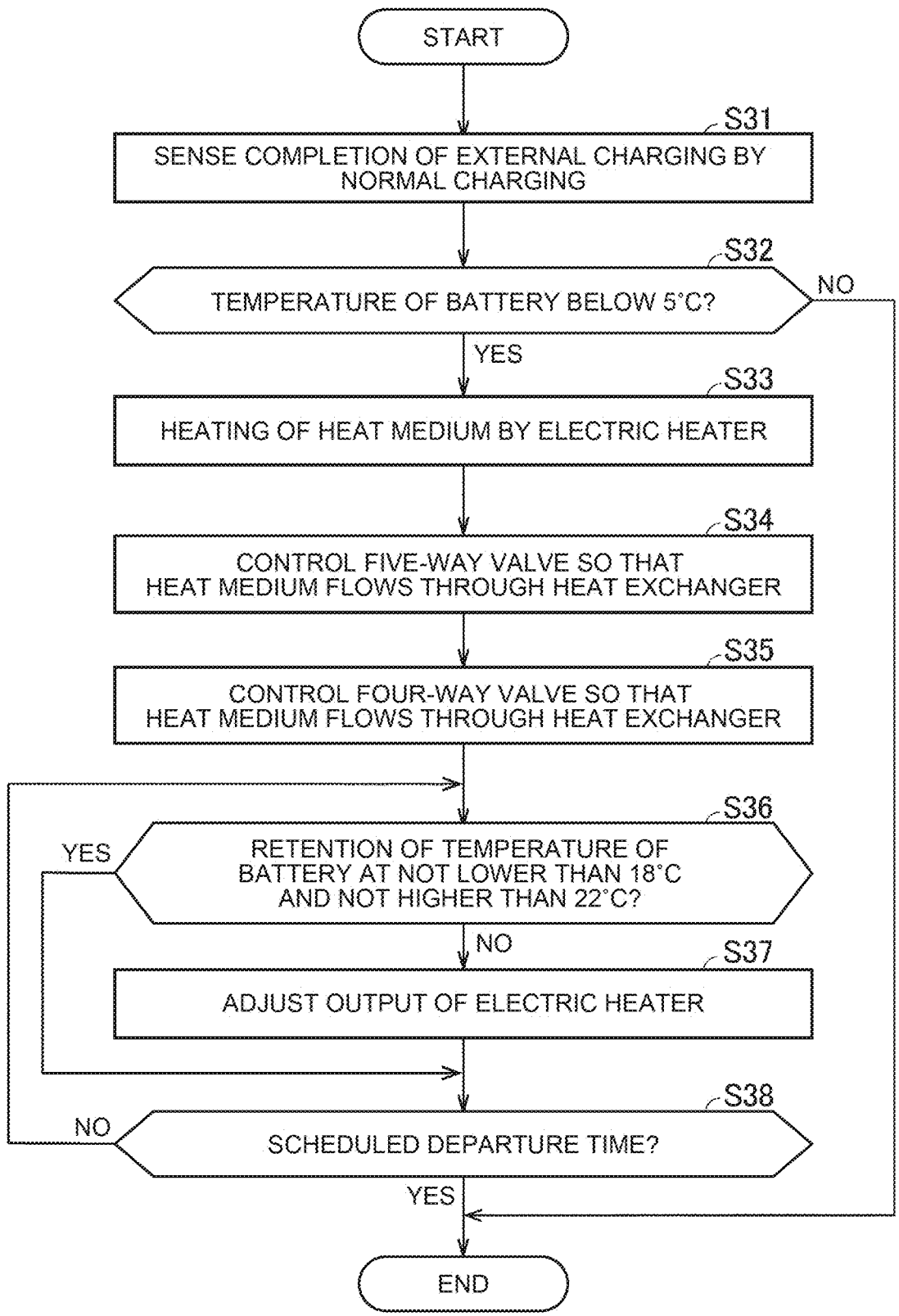
FIG. 8 is a flowchart showing heat retention control performed by the thermal management system following normal charging, according to the embodiment.

FIG. 8 is a flowchart of control for heat retention of the battery 172 following normal charging. Assumption will be made that in step S31, the ECU 500 senses that external charging by normal charging has ended.

The processing in each of steps S32 to S37 below is the same as the processing in steps S12 to S17 in FIG. 6. Note that in step S32, the ECU 500 determines whether the temperature of the battery 172 is below 5° C. Also, in step S36, the ECU 500 determines whether heat retention of the battery 172 is performed within a range of not lower than 18° C. and not higher than 22° C. (a temperature range that is suitable for charging/discharging the battery 172 while the electrified vehicle 10 is traveling). Note that the threshold value of 5° C. in step S32 is an example of a "third threshold value" in the present disclosure. The third threshold value may be a value other than 5° C. Also, in step S36, the determination criteria employed may be other than the range of not lower than 18° C. and not higher than 22° C.

In step S38, the ECU 500 determines whether a scheduled departure time set by the user of the electrified vehicle 10 has come. When the scheduled departure time has come (Yes in S38), the processing ends. When the scheduled departure time has not come (No in S38), the processing returns to step S36.

Cooling Control While Traveling

Figure 9:
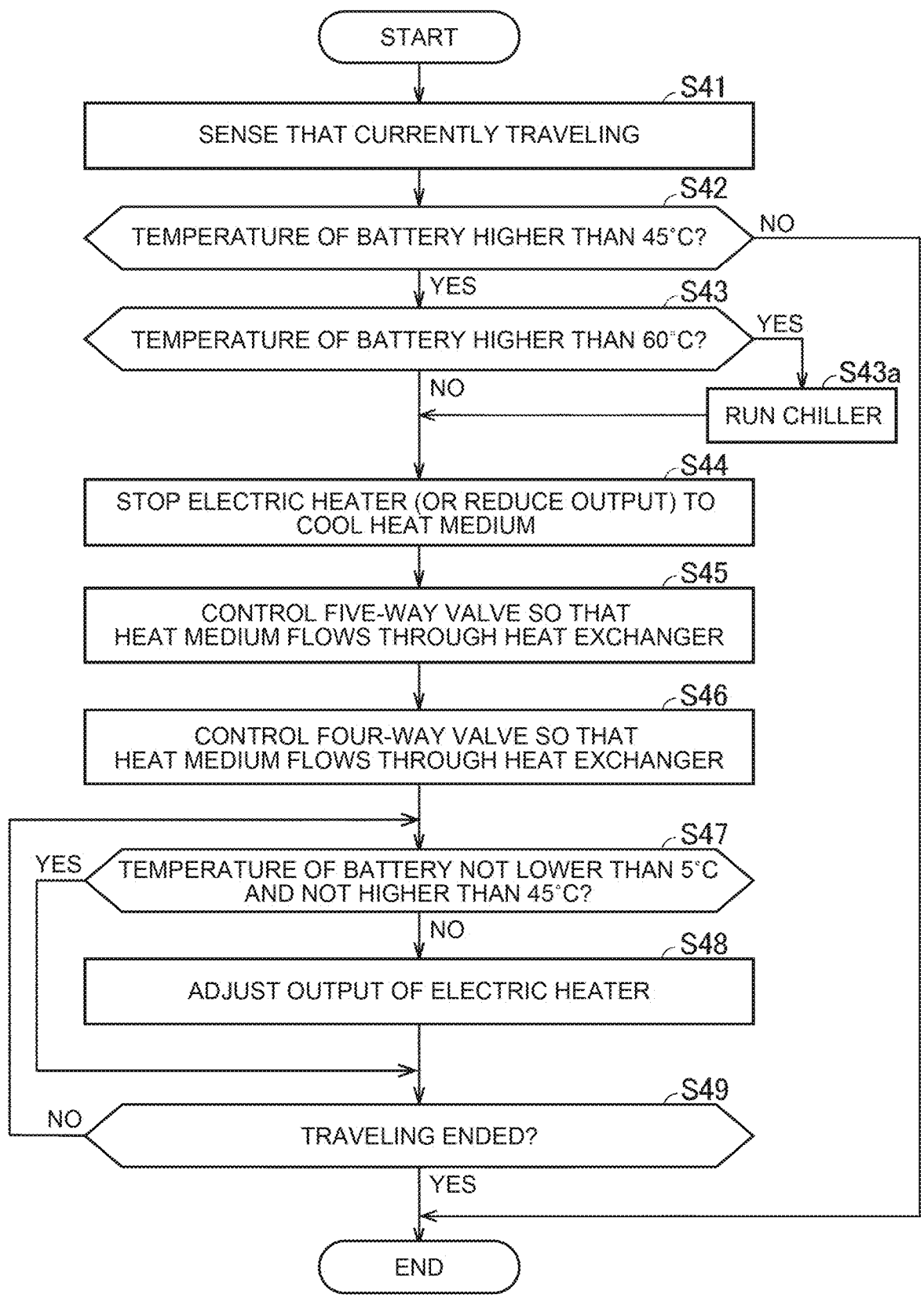
FIG. 9 is a flowchart showing cooling control performed by the thermal management system, according to the embodiment.

FIG. 9 is a flowchart of cooling control for the battery 172 while the electrified vehicle 10 is traveling. Assumption will be made that the ECU 500 senses that the electrified vehicle 10 is travelling in step S41. Note that step S41 may be, for example, a step of sensing that the electrified vehicle 10 has started charging.

In step S42, the ECU 500 determines whether the temperature of the battery 172 sensed by the temperature sensor 175 is higher than 45° C., for example. When the temperature of the battery 172 is higher than 45° C. (Yes in S42), the processing advances to step S43. When the temperature of the battery 172 is not higher than 45° C. (No in S42), the temperature of the battery 172 is suitable for charging/discharging of the battery 172, and accordingly the processing ends. Note that the above 45° C. is an example of a "fourth threshold value" in the present disclosure. The fourth threshold value may be a value other than 45° C.

In step S43, the ECU 500 determines whether the temperature of the battery 172 sensed by the temperature sensor 175 is higher than 60° C., for example. Higher than 60° C. is an example of a temperature range indicating that the temperature of the battery 172 is a high-temperature that is unsuitable for charging/discharging of the battery 172 (a temperature that requires prompt cooling of the battery 172). When the temperature of the battery 172 is higher than 60° C. (Yes in S43), the processing advances to step S43a. When the temperature of the battery 172 is not higher than 60° C. (No in S43), the processing advances to step S44. Note that the above threshold value may be a value other than 60° C.

In step S43a, the ECU 500 performs control to cool the battery 172 by driving the chiller 160. Thereafter, the processing advances to step S44.

In step S44, the ECU 500 stops the electric heater 112 (or reduces output thereof). Thus, the heat medium flowing through the high-temperature circuit 110 is cooled.

The processing of each of steps S45 to 47 is the same as the processing of steps S4 to S6 in FIG. 5, and accordingly repetitive description will not be made. Note that in step S47, the ECU 500 determines whether the temperature of the battery 172 is within a range of not lower than 5° C. and not higher than 45° C. (a temperature range that is suitable for charging/discharging the battery 172 while the electrified vehicle 10 is traveling). In step S47, the determination criteria employed may be other than the range of not lower than 5° C. and not higher than 45° C.

In step S48, the ECU 500 adjusts the output of the electric heater 112. For example, when determination is made in step S47 that the temperature of the battery 172 is below 5° C., the ECU 500 may either run the electric heater 112 that is stopped, or increase the output of electric heater 112 that is running. Also, when determination is made in step S47 that the temperature of the battery 172 is higher than 45° C., the ECU 500 may either stop the electric heater 112 that is running, or reduce the output of electric heater 112 that is running.

In step S49, the ECU 500 determines whether traveling of the electrified vehicle 10 has ended. When traveling has ended (Yes in S49), the processing ends. When traveling has not ended (No in S49), the processing returns to step S47.

As described above, in the present embodiment, the ECU 500 controls heat exchange in the heat exchanger 176 to which the portion 170a between the battery 172 and the five-way valve 180 is connected. Accordingly, the temperature of the battery 172 can be controlled by the heat exchanger 176 provided relatively near to the battery 172, so that the temperature of the battery 172 can be precisely controlled.

Although an example in which the thermal management circuit 100 includes the four-way valve 113 has been described in the above embodiment, the present disclosure is not limited to this. The thermal management circuit 100 may include a multi-way valve other than the four-way valve, or the four-way valve 113 may not be provided.

In the above embodiment, an example is described in which heat exchange in the heat exchanger 176 is controlled based on values sensed by the temperature sensor 175 that senses the temperature of the battery 172, but the present disclosure is not limited to this. For example, heat exchange in heat exchanger 176 may be controlled based on a value sensed by a temperature sensor that senses the ambient air temperature.

In the above embodiment, an example is described in which the battery 172 is installed in the electrified vehicle 10, but the present disclosure is not limited to this. The battery 172 may be installed in electrical equipment (e.g., stationary power storage equipment) other than an electrified vehicle.

In the above embodiment, an example is described in which no heater is provided in the low-temperature circuit 130, but the present disclosure is not limited to this. An electric heater may be provided in the low-temperature circuit 130 (e.g., between the heat exchanger 176 and the battery 172).

In the above embodiment, an example is described in which the five controls shown in FIGS. 5 to 9 are performed, but the present disclosure is not limited to this. An arrangement may be made in which just part of the control in FIGS. 5 to 9 is performed.

In the above embodiment, an example is described in which the five-way valve 180 and the four-way valve 113 are used, but the present disclosure is not limited to this. A multi-way valve other than a five-way valve and a four-way valve (e.g., six-way valve) may be used.

In the above embodiment, an example is described in which the thermal management circuit 100 is set to the second communication pattern illustrated in FIG. 4 when temperature control of the battery 172 is performed using the heat exchanger 176, but the present disclosure is not limited to this. For example, the states of the thermal management circuit 100 may be different for each control in FIGS. 5 to 9. For example, in a case of any one of FIGS. 5 to 9, the heat medium does not have to flow through the high-temperature radiator 121 or the heater core 114 in the high-temperature circuit 110.

In the above embodiment, an example is described in which the temperature control of the battery 172 by the heat exchanger 176 is performed based on a rapid charger being searched for or searched for and found, external charging being started, and vehicle traveling or the like being sensed, but the present disclosure is not limited to this. For example, the above temperature control may be performed based on the user performing a predetermined operation. Alternatively, instead of searching for or searching for and finding a rapid charger, the temperature control may be performed based on state of charge (SOC) of the electrified vehicle 10 falling below a predetermined value (e.g., 50%).

In the above embodiment, an example is described in which heat retention of the battery 172 is performed until the scheduled departure time following completion of external charging, but the present disclosure is not limited to this. Control for heating the battery 172 using the heat exchanger 176 may be started at a predetermined amount of time prior to the scheduled departure time (e.g., 30 minutes before).

Note that configurations (processing) of the above embodiment and the above modifications may be combined with each other.

The embodiments disclosed herein should be construed as exemplary in all respects and not limiting. The scope of the present disclosure is set forth in the claims rather than in the above description of the embodiments, and is intended to include all modifications within the meaning and scope equivalent to those of the claims.

What is claimed is:

1. A thermal management system comprising:
   a thermal management circuit that includes a first refrigerant circuit through which a first refrigerant flows and that includes a battery and a first radiator, and a second refrigerant circuit through which a second refrigerant different from the first refrigerant flows and that includes a heater;
   a first switching valve configured to switch between a first state in which the first refrigerant flows through the battery and a second state in which no refrigerant flows through the battery;
   a heat exchanger that is configured to perform heat exchange between the first refrigerant and the second refrigerant, and that is connected to (a) a portion of the first refrigerant circuit between the battery and the first switching valve, and (b) a predetermined portion of the second refrigerant circuit; and
   an electronic control unit including a processor that is configured to control each of the first switching valve and the heater, wherein
   the processor is configured to control the first switching valve such that the first refrigerant flows through the battery, and to control the heater, so as to control the heat exchange between the first refrigerant and the second refrigerant in the heat exchanger.

2. The thermal management system according to claim 1, wherein:
   the second refrigerant circuit further includes a second radiator that is different from the first radiator; and
   the heat exchanger is provided independently of the first radiator and the second radiator.

3. The thermal management system according to claim 1, further comprising a second switching valve configured to switch whether the second refrigerant flows through the heat exchanger, wherein the processor is configured to control the second switching valve so as to cause the second refrigerant to flow through the heat exchanger, when the heat exchange between the first refrigerant and the second refrigerant in the heat exchanger is performed.

4. The thermal management system according to claim 1, further comprising a temperature sensor configured to sense a temperature of the battery, wherein the processor is configured to, based on the temperature of the battery sensed by the temperature sensor, control the heat exchange between the first refrigerant and the second refrigerant in the heat exchanger.

5. The thermal management system according to claim 4, wherein the processor is configured to, when the temperature of the battery sensed by the temperature sensor is lower than a first threshold value, perform heating control in which the battery is heated by driving the heater to heat the second refrigerant such that the first refrigerant that is heat-exchanged with the second refrigerant is heated.

6. The thermal management system according to claim 5, wherein the processor is configured to perform the heating control, when the temperature of the battery sensed by the temperature sensor is lower than a second threshold value and external charging of the battery is executed.

7. The thermal management system according to claim 5, wherein:
   the battery is installed in an electrified vehicle; and
   the processor is configured to, when the temperature of the battery sensed by the temperature sensor is lower than a second threshold value, retain the temperature of the battery within a predetermined temperature range, by performing the heating control following charging of the battery, until a travelling start time of the electrified vehicle.

8. The thermal management system according to claim 4, wherein the processor is configured to, when the temperature of the battery sensed by the temperature sensor is higher than a threshold value, perform cooling control in which the battery is cooled by stopping driving of the heater to cool the second refrigerant such that the first refrigerant that is heat-exchanged with the second refrigerant is cooled.

9. A control method of a thermal management system including (1) a thermal management circuit that includes a first refrigerant circuit through which a first refrigerant flows and that includes a battery and a first radiator, and a second refrigerant circuit through which a second refrigerant different from the first refrigerant flows and that includes a heater, (2) a first switching valve configured to switch between a first state in which the first refrigerant flows through the battery and a second state in which no refrigerant flows through the battery, and (3) a heat exchanger that is configured to perform heat exchange between the first refrigerant and the second refrigerant, and that is connected to (a) a portion of the first refrigerant circuit between the battery and the first switching valve, and (b) a predetermined portion of the second refrigerant circuit, the control method comprising:
   adjusting a temperature of the second refrigerant by controlling the heater; and
   controlling the first switching valve to cause the first refrigerant to flow through the battery such that heat exchange between the first refrigerant and the second refrigerant is performed in the heat exchanger.

10. The thermal management system according to claim 1, wherein the first switching valve is configured to cause the first refrigerant to flow through a bypass path that bypasses the heat exchanger and the battery when the first switching valve is in the second state.

11. The thermal management system according to claim 1, wherein the heat exchanger is located in the first refrigerant circuit between the battery and the first switching valve with respect to a flow direction of the first refrigerant through the first refrigerant circuit so that the first refrigerant, after passing through the first switching valve, passes through the heat exchanger before passing through the battery.

\* \* \* \* \*